No. 826,710. PATENTED JULY 24, 1906.
I. N. CROSSLAND.
NUT LOCK.
APPLICATION FILED OCT. 9, 1905.
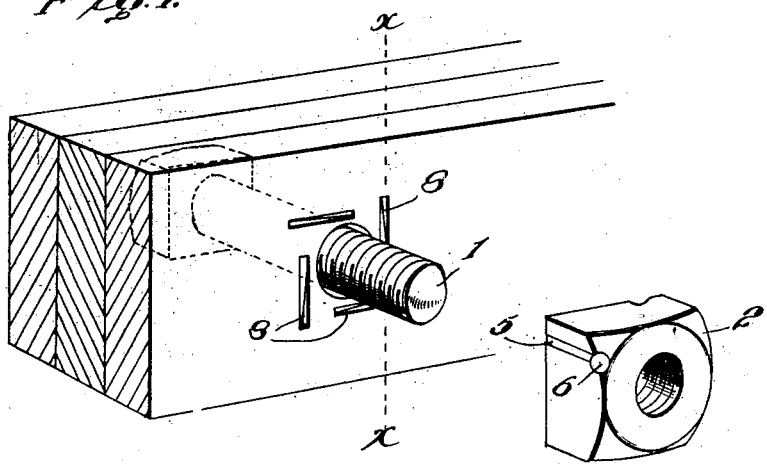
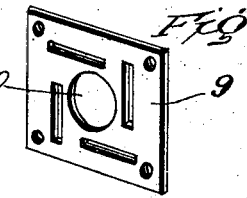
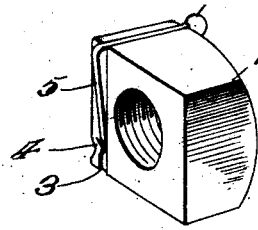
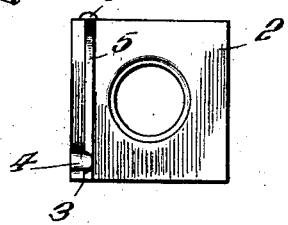
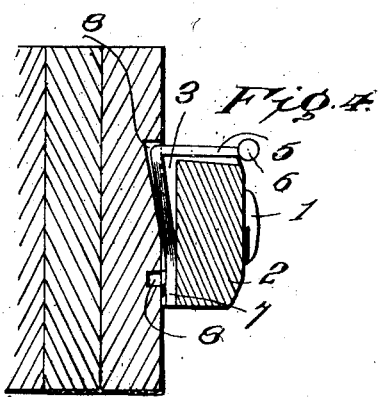
Witnesses
L. H. Schmidt.
L. O. Langworthy.
Inventor
Isaac N. Crossland
By Watson E. Coleman
Attorney.
THE NORRIS PETERS CO., WASHINGTON, D. C.

UNITED STATES PATENT OFFICE.

ISAAC N. CROSSLAND, OF NEW FLORENCE, PENNSYLVANIA.

NUT-LOCK.

No. 826,710.　　　Specification of Letters Patent.　　　Patented July 24, 1906.

Application filed October 9, 1905. Serial No. 281,980.

*To all whom it may concern:*

Be it known that I, ISAAC N. CROSSLAND, a citizen of the United States, residing at New Florence, in the county of Westmoreland and State of Pennsylvania, have invented certain new and useful Improvements in Nut-Locks, of which the following is a specification, reference being had therein to the accompanying drawings.

My invention relates to nut-locks, and more particularly that class wherein a spring-key is carried by the nut and adapted to engage with notches or kerfs set in the material surrounding the bolt and through which it passes, one of the objects being to provide a device of the character described that shall be useful on railroads, machinery, agricultural implements, iron or steel structural framework of buildings, bridges, and, in fact, in all places where a practical and effectual nut-lock is desired.

A further object is to provide a device of the character described that shall be simple and inexpensive in construction and effective in operation and one that will hold the nut securely in place and yet by means of which a nut may be easily and quickly removed and replaced when desired.

Other objects and advantages of my invention, as well as the structural features by means of which these objects are attained, will be made clear by an examination of the specification, taken in connection with the accompanying drawings, in which the same reference-numerals indicate corresponding portions throughout, and in which—

Figure 1 is a perspective view of three pieces of material, showing the threaded end of a bolt protruding from a hole therethrough, the remainder of the bolt appearing in dotted lines and showing disjoined notches or kerfs surrounding the bolt and arranged at right angles with each other. This view also shows a nut constructed in accordance with my invention and in line to be presented to the threaded end of the bolt. Fig. 2 is a perspective view of a nut provided with an angular channel or groove extending across the bottom and one of its edges and having a spring-key secured thereto at one of its ends and resting in the channel or groove. Fig. 3 is a bottom plan of the nut shown in Fig. 2. Fig. 4 is a transverse section taken on lines X X of Fig. 1. Fig. 5 is a perspective view of the spring-key detached from the nut; and Fig. 6 is a plate which may be secured to the material to be held in place by the bolt and nut and having notches or kerfs therein instead of having said notches or kerfs in the material, as shown in Fig. 1, the plate being provided with a central opening for the passage of the threaded end of the bolt.

1 designates a bolt, and 2 a nut of the ordinary well-known construction. The nut is provided with a channel or groove 3, extending across the bottom thereof and also across one of its edges. Resting in said channel and secured in place therein at one end thereof in any suitable manner, preferably by a bead 4, formed integral with the nut and overhanging the channel, as shown in Figs. 2 and 3, is a spring-key 5. This key is provided with a knob or ball 6 at its free end, by means of which it is more easily operated, and the other end 7 is bent at a slight angle, and approximately midway between the said angle and the ball or knob said key is bent at a right angle. This key rests in the channel 3, the end 7 being engaged by the bead 4, which operates to hold it securely in position, and the end which is bent at a slight angle rests on the bottom of the channel, the remainder of the key extending along the bottom of the nut gradually protruding beyond the edges of the channel in order to fall into the notches or kerfs 8, having slanting bottoms, as best shown in Fig. 4, said notches or kerfs being cut to correspond to that part of the key protruding from the channel 3 in the bottom of the nut, so that when the nut is screwed on the bolt until the key falls into one of said notches it practically fills it and holds the nut securely in position until it is withdrawn. In Fig. 1 these notches 3 are shown cut or sunk in the material—such, for example, as the girders of a bridge or building or a fish-plate on a railway. A slightly-modified form and arrangement may be had by the use of a plate 9, having the notches 3 cut therein. This plate is provided with a central opening 10 for the passage of the bolt 1 and may be secured on the material by any suitable means. The object of this modification is to provide means for effectually locking the nut when wood or like material is used.

In operation the nut is screwed upon the threaded end of the bolt until the key 5 contacts with the material or the plate 9, where it is gradually pressed into the channel 3 as the nut tightens until said key is directly over one of said kerfs or notches 8, which it falls into by reason of its own tension and securely locks the nut in place. It will be observed that there are four of these notches or kerfs 8, and they are so arranged around the bolt 1 that the key 5 will fall into one of them at every quarter-turn of the nut. To release the nut, pressure is brought to bear on the key by means of the ball or knob 6, which enables it to be easily grasped by the fingers or thumb. That part of the channel 3 extending across one edge of the nut has a slanting bottom, thus causing said channel to grow deeper as it extends toward the top of the nut, and this enables the operator to press the arm of the key provided with the ball or knob until said key will rest entirely within the channel, thus bringing it out of the notch or kerf 8 and allowing the nut to be easily removed.

Having thus described my said invention, what I claim as new, and desire to secure by Letters Patent of the United States, is—

1. In a nut-lock, the combination, with a nut having a groove or channel extending across the bottom and one of its edges, of a spring-key bent at right angles and arranged in the channel, one end of said key being fixed and the other end free, said key being adapted to project beyond the walls of the channel and automatically engage notches or kerfs whereby the nut is locked and held in locked position.

2. In a nut-lock, the combination, with a nut having a channel extending across the bottom and one of its edges, of a spring-key bent at right angles and arranged in the channel, one end of said key being fixed and the other end free, a knob or ball carried by the free end of the key whereby it is operated, and a fixed plate or washer having notches or kerfs adapted to be engaged by the key.

In testimony whereof I hereunto affix my signature in presence of two witnesses.

ISAAC N. CROSSLAND.

Witnesses:
 J. N. CROSSLAND
 WM. McCUNE.